United States Patent
Chen et al.

(10) Patent No.: US 10,075,726 B2
(45) Date of Patent: Sep. 11, 2018

(54) VIDEO DECODING METHOD/DEVICE OF DETECTING A MISSING VIDEO FRAME

(71) Applicant: MediaTek Inc., Hsin-Chu (TW)

(72) Inventors: Ying-Jui Chen, Jhubei (TW); Chung-Bin Wu, Kaohsiung (TW); Ya-Ting Chuang, Jhubei (TW)

(73) Assignee: MEDIATEK INC., Hsin-Chu (TW)

( * ) Notice: Subject to any disclaimer, the term of this patent is extended or adjusted under 35 U.S.C. 154(b) by 152 days.

(21) Appl. No.: 14/991,830

(22) Filed: Jan. 8, 2016

(65) Prior Publication Data

US 2016/0127740 A1    May 5, 2016

Related U.S. Application Data

(60) Continuation of application No. 13/343,593, filed on Jan. 4, 2012, which is a division of application No. 12/340,872, filed on Dec. 22, 2008, now abandoned.

(51) Int. Cl.
| | |
|---|---|
| *H04N 19/513* | (2014.01) |
| *H04N 19/70* | (2014.01) |
| *H04N 19/44* | (2014.01) |
| *H04N 19/895* | (2014.01) |
| *H04N 19/577* | (2014.01) |
| *H04N 19/172* | (2014.01) |

(52) U.S. Cl.
CPC ......... *H04N 19/513* (2014.11); *H04N 19/172* (2014.11); *H04N 19/44* (2014.11); *H04N 19/577* (2014.11); *H04N 19/70* (2014.11); *H04N 19/895* (2014.11)

(58) Field of Classification Search
CPC .................................................. H04N 19/513
USPC .................................................. 375/240.25
See application file for complete search history.

(56) References Cited

U.S. PATENT DOCUMENTS

| | | | |
|---|---|---|---|
| 5,784,527 A | 7/1998 | Ort | |
| 6,052,415 A | 4/2000 | Carr et al. | |
| 6,662,329 B1 * | 12/2003 | Foster | H04N 21/4305 |
| | | | 348/E5.002 |

(Continued)

FOREIGN PATENT DOCUMENTS

| | | |
|---|---|---|
| CA | 2209388 | 8/2001 |
| CN | 1208311 | 2/1999 |

(Continued)

OTHER PUBLICATIONS

Applications TR101290 three error analysis to determine the digital television signal failure (published on Dec. 31, 2007).

(Continued)

*Primary Examiner* — Yulin Sun
(74) *Attorney, Agent, or Firm* — McClure, Qualey & Rodack, LLP

(57) ABSTRACT

Video decoding device is disclosed. The video decoding device comprises a demultiplexer, a first decoder and a controller. The demultiplexer receives a Transport Stream to recover video Packetized Elementary Stream (PES) to determine a presentation time stamp (PTS) and a decoding time stamp (DTS) in a PES header of the PES. The first decoder retrieves a video frame from the video PES to determine temporal reference of the video frame. The controller receives the PTS, the DTS, and the temporal reference to determine whether there is a missing video frame.

12 Claims, 18 Drawing Sheets

(56) References Cited

U.S. PATENT DOCUMENTS

| | | | |
|---|---|---|---|
| 6,674,801 B1 | 1/2004 | Kim | |
| 6,990,151 B2 | 1/2006 | Kim et al. | |
| 7,006,576 B1 * | 2/2006 | Hannuksela | H04N 19/00 |
| | | | 375/240.27 |
| 8,559,527 B2 | 10/2013 | Hamada et al. | |
| 2003/0053546 A1 * | 3/2003 | Gandhi | H04L 1/20 |
| | | | 375/240.27 |
| 2005/0166123 A1 | 7/2005 | Yanamoto et al. | |
| 2005/0226336 A1 | 10/2005 | Nakaya | |
| 2006/0287956 A1 * | 12/2006 | Higashi | G06F 21/10 |
| | | | 705/51 |
| 2008/0007653 A1 * | 1/2008 | Mori | H04N 21/23406 |
| | | | 348/462 |
| 2009/0034633 A1 * | 2/2009 | Rodirguez | H04L 1/0041 |
| | | | 375/240.28 |

FOREIGN PATENT DOCUMENTS

| | | |
|---|---|---|
| CN | 101060633 | 10/2007 |
| CN | 101188771 | 5/2008 |
| JP | 2005-210219 | 8/2005 |

OTHER PUBLICATIONS

English translation of Applications TR101290 three error analysis to determine the digital television signal failure (published on Dec. 31, 2007).

\* cited by examiner

VIDEO DECODING METHOD/DEVICE OF DETECTING A MISSING VIDEO FRAME

CROSS REFERENCE OF THE RELATED APPLICATION

This application is a Continuation of application Ser. No. 13/343,593, filed on Jan. 4, 2012, now U.S. Pat. No. 9,264,729, which is a Divisional of application Ser. No. 12/340,872, filed Dec. 22, 2008, now abandoned, which are all incorporated by reference herein.

BACKGROUND OF THE INVENTION

Field of the Invention

The invention relates in general to video decoding, and in particular, to a video decoding method capable of detecting and correcting missing or undecodable video frames.

Description of the Related Art

Various functionalities are implemented in video apparatuses in order to conveniently manipulate video data. Video CODECs (encoders/decoders) typically comply with video coding standards such as MPEG 1/2/4 and H.26x to perform digital data manipulation and compression. These compression techniques achieve relatively high compression ratios by discrete cosine transform (DCT) techniques and motion compensation (MC) techniques, so that the compressed video streams can be transmitted across various digital networks or stored in various storage medium in an efficient manner.

However, since MPEG 1/2/4 and H.26x video encoding employs compression schemes which encode later video frames based on earlier video frames, when unrecoverable errors are introduced into a video bitstream during transmission, these errors found in earlier video frames can render all the later dependent frames undecodable. Typically, the video encoder skips the undecodable video frame and repeats an early decodable frame, resulting in abrupt scene changes or discontinuous movement due to a number of video frames being skipped, thus resulting in unpleasant viewing experiences for users. Therefore, there exists a need for video decoding methods capable of detecting unrecoverable errors in video bitstreams and reducing motion jerkiness to alleviate degradation of video quality due to these unrecoverable errors.

BRIEF SUMMARY OF THE INVENTION

According to a aspect of the invention, a video decoding device is disclosed. The video decoding device comprises a demultiplexer, a first decoder and a controller. The demultiplexer receives a Transport Stream to recover video Packetized Elementary Stream (PES) to determine a presentation time stamp (PTS) and a decoding time stamp (DTS) in a PES header of the PES. The first decoder retrieves a video frame from the video PES to determine temporal reference of the video frame. The controller receives the PTS, the DTS, and the temporal reference to determine whether there is a missing video frame.

According to another aspect of the invention, a video decoding method is disclosed. The method at least includes the following steps: recovering video Packetized Elementary Stream (PES) to determine a presentation time stamp (PTS) and a decoding time stamp (DTS) in a PES header of the PES; retrieving a video frame from the video PES to determine temporal reference of the video frame; and determining whether there is a missing video frame according to the PTS, the DTS, and the temporal reference.

BRIEF DESCRIPTION OF THE DRAWINGS

The invention can be more fully understood by reading the subsequent detailed description and examples with references made to the accompanying drawings, wherein:

FIG. 15b illustrates an embodiment for generating a forward motion vector for a P-frame according to the embodiment in FIG. 15a.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The video decoding scheme embodiments disclosed herein fully comply with the Moving Picture Expert Group MPEG Standards.

Figure 1:
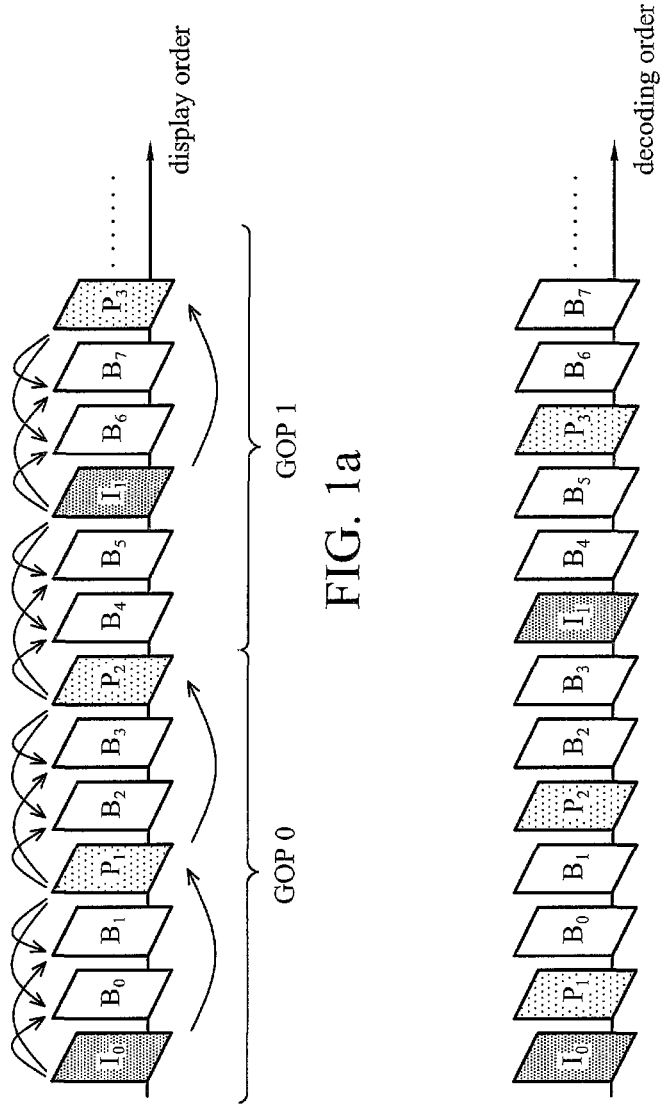
FIG. 1a shows an example of groups of pictures in a display order.
FIG. 1b shows an example of groups of pictures in a decoding order.

When a video decoder decodes and plays video data, the decoding order and the display order may be different, as shown in FIGS. 1a and 1b. FIG. 1a shows groups of pictures (GOP) in a display order and FIG. 1b shows groups of pictures in a decoding order. The groups of pictures of FIGS. 1a and 1b comprise frame sequences of intra (I-frame), prediction (P-frame), or bidirectional (B-frame) frames, wherein each video frame is displayed at a fixed interval, and each video frame is represented by a letter indicating the type of frame and a number indicating the displaying order or the decoding order. An I-frame is usually the first frame of a GOP, and is intra-coded or intra-prediction coded without temporal motion compensation. A P-frame is predicted from an immediately preceding I-frame or P-frame. A B-frame is predicted bidirectionally from preceding and succeeding I-frames or P-frames. I-frames and P-frames are known as reference frames as they are used to define future frames in the decoding order. Please note, it is also possible for a P-frame to refer multiple frames, a B-frame to refer multiple preceding and succeeding frames, as well as utilizing B-frames as reference frames in more recent video coding standards. The video decoder decodes sets of video frames GOP0 and GOP1 in a decoding order $\{I_0, P_1, B_0, B_1, P_2, B_2, B_3, I_1, B_4, B_5, P_3, B_6, B_7\}$ as shown in FIG. 1b, while playing in a different display order $\{I_0, B_0, B_1, P_1, B_2, B_3, P_2, B_4, B_5, I_1, B_6, B_7, P_3\}$ as shown in FIG. 1a. Predictive coding and decoding of P-frames and B-frames are dependent on preceding or/and succeeding video frames, as decoding a later predictive video frame typically requires decoded data derived from decoding one or more earlier reference frames, thus when an earlier reference frame is missing or undecodable, the later predictive video frames can no longer be decoded and displayed, resulting in motion jerkiness in the video and unpleasant viewing experience for users.

Figure 2:
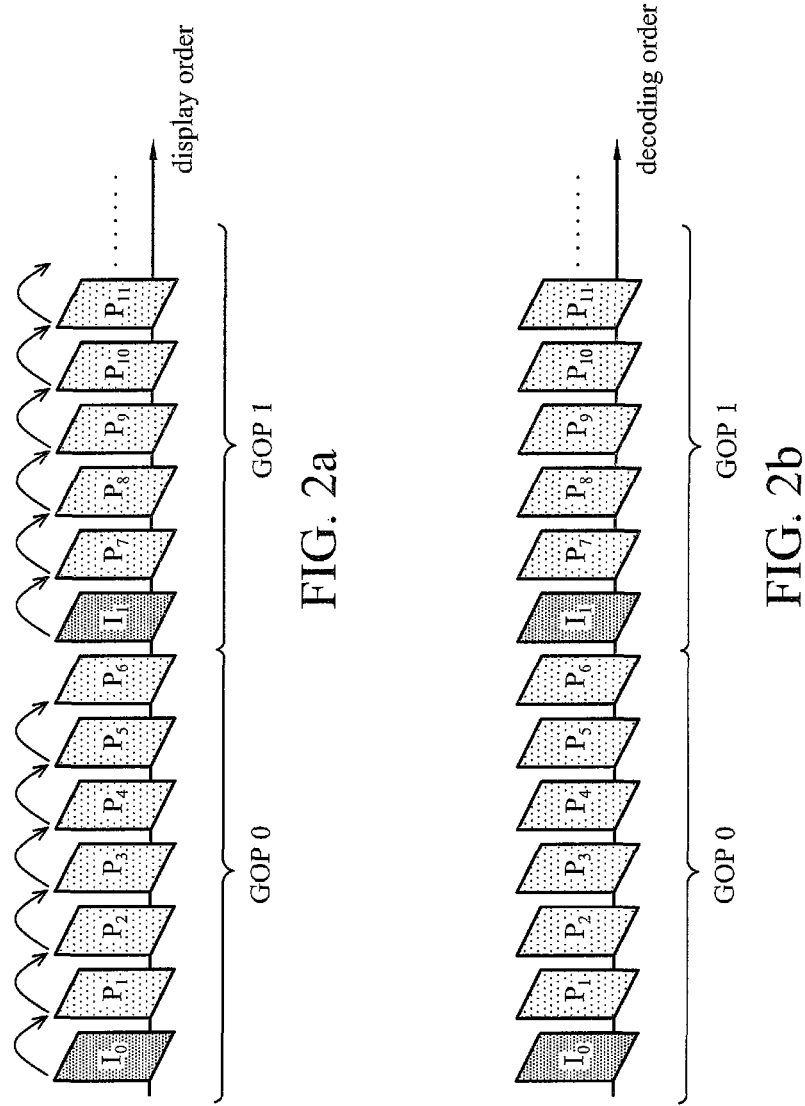
FIG. 2a shows another example of groups of pictures in a display order.
FIG. 2b shows another example of groups of pictures in a decoding order.

FIGS. 2a and 2b show groups of pictures comprising only I-frames and P-frames in a display order and decoding order. The video decoder decodes sets of video frames GOP0 and GOP1 in a decoding order $\{I_0, P_1, P_2, P_3, P_4, P_5, P_6, I_1, P_7, P_8, P_9, P_{10}, P_{11}\}$ as shown in FIG. 2b, while playing in an identical display order $\{I_0, P_1, P_2, P_3, P_4, P_5, P_6, I_1, P_7, P_8, P_9, P_{10}, P_{11}\}$ as shown in FIG. 2a. Predictive coding and decoding of P-frames are dependent on preceding reference frames, as decoding a later predictive video frame typically requires decoded data derived from decoding one or more earlier reference frames, thus when an earlier reference frames is missing or undecodable, the later predictive video frames can no longer be decoded and displayed, causing unpleasant viewing experience for users.

Figure 3:
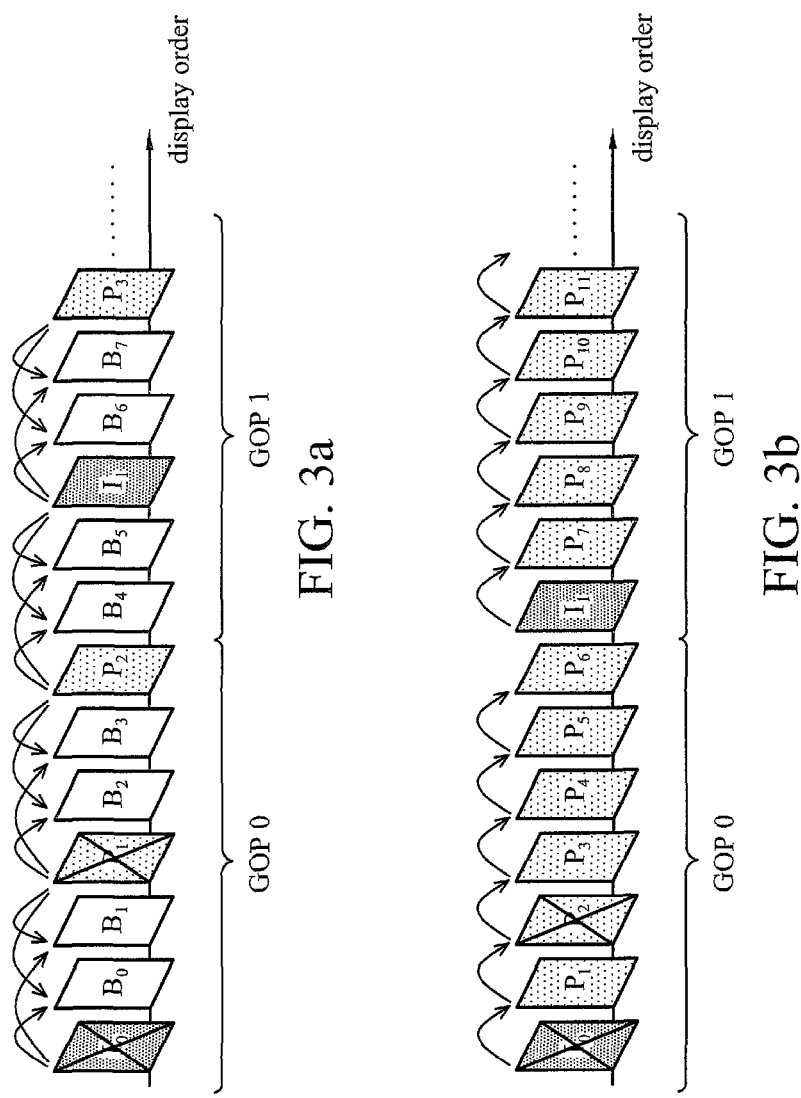
FIG. 3a illustrates effect of a corrupted video frame in groups of pictures comprising I-frames, P-frames, and B frames.
FIG. 3b illustrates effect of a corrupted video frame in groups of pictures comprising only I-frames and P-frames.

FIG. 3a illustrates effect of a corrupted video frame in a group of pictures comprising I-frames, P-frames, and B-frames. FIG. 3b illustrates effect of a corrupted video frame in a group of pictures comprising only I-frames and P-frames. In FIG. 3a, if the first I-frame $I_0$ is undecodable, rendering its dependent frames $P_1$, $B_0$, and $B_1$ undecodable, and subsequently causing subsequent video frames of the entire GOP $\{P_2, B_2, B_3\}$ to be undecodable. Video frames $B_2$ and $B_3$ may also be undecodable if they use forward reference. If the first P-frame $P_1$ is undecodable, its dependent frames $P_2$, $B_2$, and $B_3$ are also undecodable, thus causing the subsequent video frames $B_4$ and $B_5$ to be undecodable, video frames $B_4$ and $B_5$ are also undecodable if they use forward reference, i.e., the corrupted or missing prior reference frame may render all later video frames in decoding order undecodable. In FIG. 3b, if the first I-frame $I_0$ is undecodable, all video frames in the same GOP are undecodable, and if the second P-frame $P_2$, is undecodable, remaining frames of the GOP $\{P_3, P_4, P_5, P_6\}$ are also undecodable. In the conventional video decoding approach, the video decoder drops any undecodable video frame. In the cases in FIGS. 3a and 3b, the video frame drops the corrupted reference frame and all subsequent frames affected thereby, resulting in abrupt scene changes due to a number of pictures being skipped, causing an unpleasant viewing experience for viewers.

Figure 4:
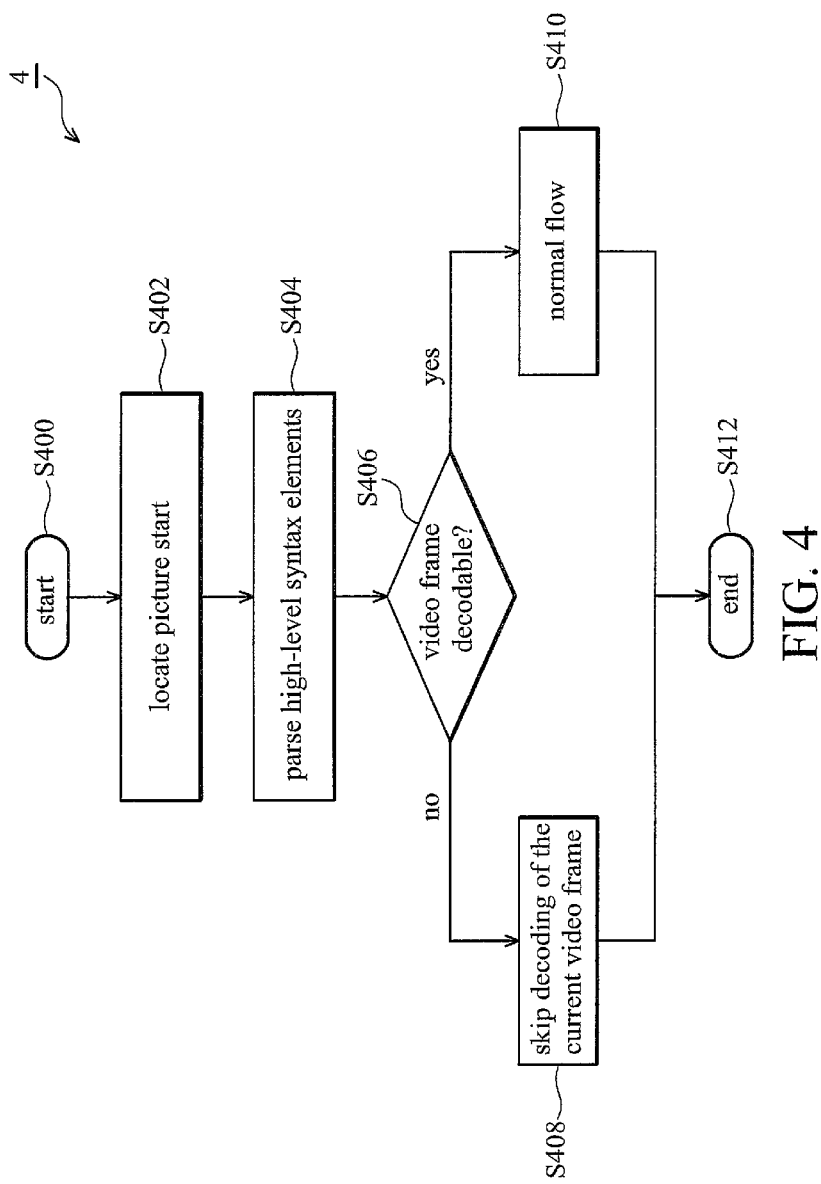
FIG. 4 is a flowchart of a conventional video decoding method.

FIG. 4 is a flowchart of a conventional video decoding method. Upon start of video decoding, a video decoder receives a video bitstream and locates a picture start thereof (S402), parses high-level syntax elements (S404) to determine whether the video frame is decodable (S406), skips decoding of the video frame if the video frame is undecodable (S408), or continues video decoding and processing of the decoded video data if otherwise (S410). The high-level syntax elements are syntax elements above the macroblock layer, and may be the syntax elements in a sequence header, group of picture header, or picture header. The video frame is said to be undecodable when the reference frame is missing, high-level syntax error occurs, or when part or all of the picture data is corrupted. Because the video decoder skips all undecodable video frames in step S408, there might be abrupt scene changes due to a large number of pictures being left out, causing unpleasant viewing experience for viewers.

Figure 5:
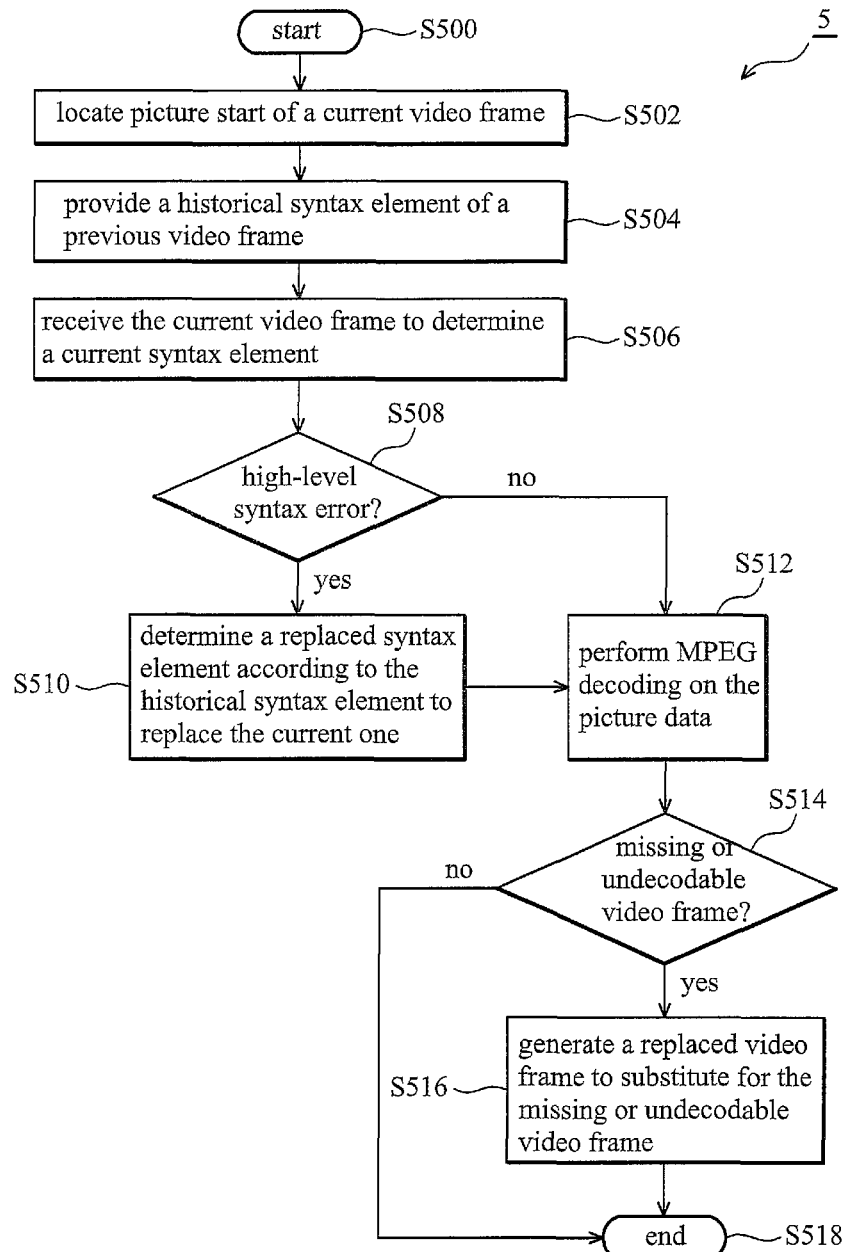
FIG. 5 is a flowchart of an exemplary video decoding method according to the invention.

To counter this problem, a video decoding scheme according to an embodiment of the present invention is provided in FIG. 5, showing a flowchart of an exemplary video decoding method incorporated by a video decoder.

Upon start of the video decoding method 5 (S500), the video decoder retrieves a video bitstream from a video buffer and locates the start of a video frame (S502), provides a historical syntax element of a previous video frame (S504), receives a current video frame to determine a current syntax element (S506), determines whether a high-level syntax error is present in the current syntax element (S508), and determines a replaced syntax element according to the historical syntax element to replace the current syntax element upon detection of the high-level syntax error (S510). In MPEG systems, each video frame contains a synchronization sequence at the beginning to indicate the start of a video frame, known as the picture start. The timing relationship of the previous and current video frames is in terms of the decoding order, i.e., the previous video frame is decoded before a current one. The high-level syntax error is a syntax error above a Macroblock layer, including the syntax elements in a sequence header, group of picture header, or picture header. For example, when a syntax element in the picture header exceeds a legal value boundary, the video decoder may identify it as a picture-layer syntax error. In step S510, the video decoder may assign the historical syntax element to be the replaced syntax element, or determine a likely value for the replaced syntax element based on the historical syntax elements if the syntax element has a periodic property.

When there is no error detected in the syntax elements or the high-level syntax element has been fixed by the replaced syntax element, the video decoder continues to perform MPEG decoding on the picture data in the current video frame in step S512. Next in step S514, the video decoder decodes the current video frame to detect whether there is a missing video frame or the current video frame is undecodable, and upon detection of the missing video frame or undecodable video frame, generates a replacement video frame to substitute the missing or undecodable video frame (S516). The video decoder determines the video frame to be undecodable when the reference frame is missing, high-level syntax error occurs, or when part or all of the picture data is corrupted. The generation of the replacement video frame comprises assigning a closest decodable video frame in display order to be the replacement video frame, or generating a replacement video frame according to motion vectors of a decodable video frame and a temporal distance between the current video frame and the decodable video frame.

Figure 6:
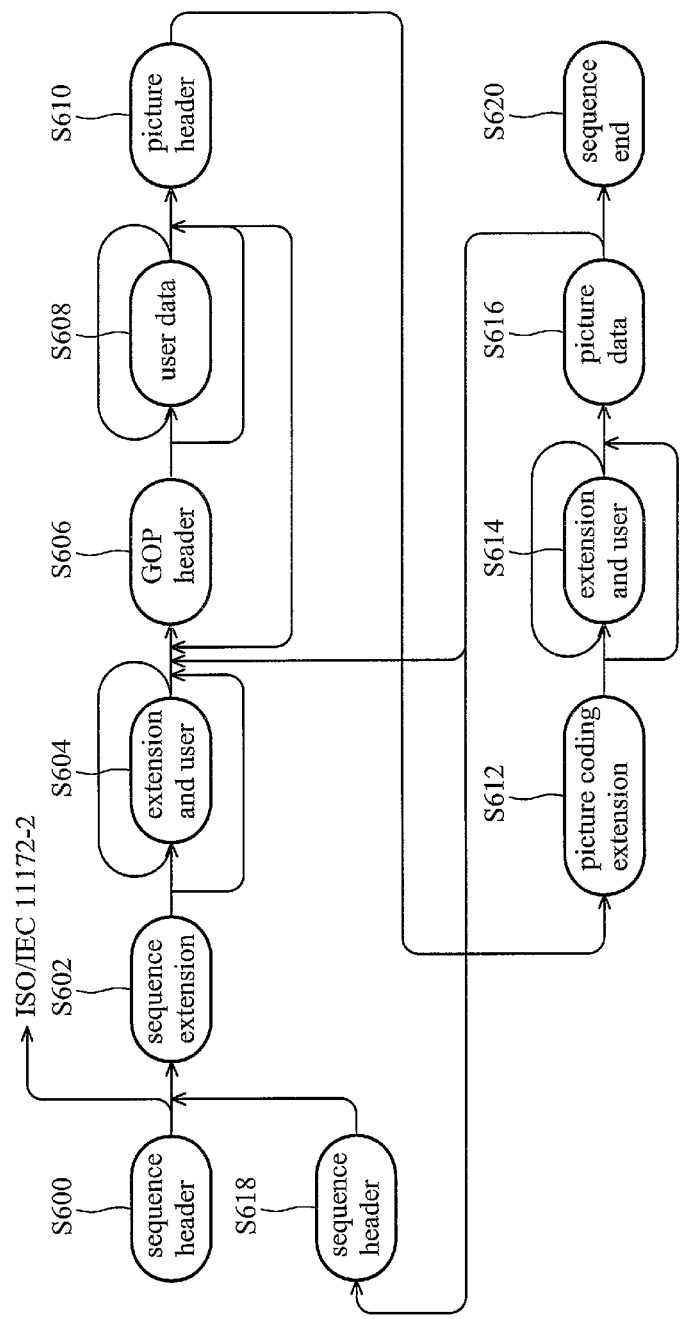
FIG. 6 illustrates an embodiment of a high level bitsteam organization for parsing the high-level syntax elements according to the video decoding method in FIG. 5.

FIG. 6 illustrates an embodiment of a high level bitsteam organization for parsing the high-level syntax elements according to the video decoding method in FIG. 5. The video bitstream received by the video decoder undergoes various levels of data checks including the syntax checks for a sequence header (S600), sequence extension (S602), extension and user (S604), group of picture header (S606), user data (S608), picture header (S610), picture coding extension (S612), sequence extension and user (S614), and finally the video decoder performs predictive decoding on the picture data at the macroblock level (S616). All syntax checks prior to the video decoding in step S616 are within the scope of the high-level syntax check in the invention.

In one embodiment, the video decoder parses the syntax elements in the sequence header (S600), and two of the syntax elements aspect_ratio and frame_rate contain illegal value 0000. Next, instead of outputting the error response "forbidden value in 13818-2" to indicate the syntax errors and stop decoding and data processing as in the conventional art, the video decoder of the invention corrects these errors by assigning the value derived from the historical syntax element as the current syntax element (S510 in FIG. 5) and continues video decoding of the picture data, using the available information to reduce the undecodable number of video frames in the picture set and enhance video quality. In another embodiment, the video decoder parses the syntax elements in the picture header (S610), and detects an illegal value "100" for a syntax element "picture_coding_type". Next, instead of dropping the undecodable data in the conventional art, the video decoder carries out an estimation for the picture coding type of the current video frame to be either I, P, or B-frame based on the picture types of the historical syntax elements (S510), and continues to perform video decoding.

Figure 7:
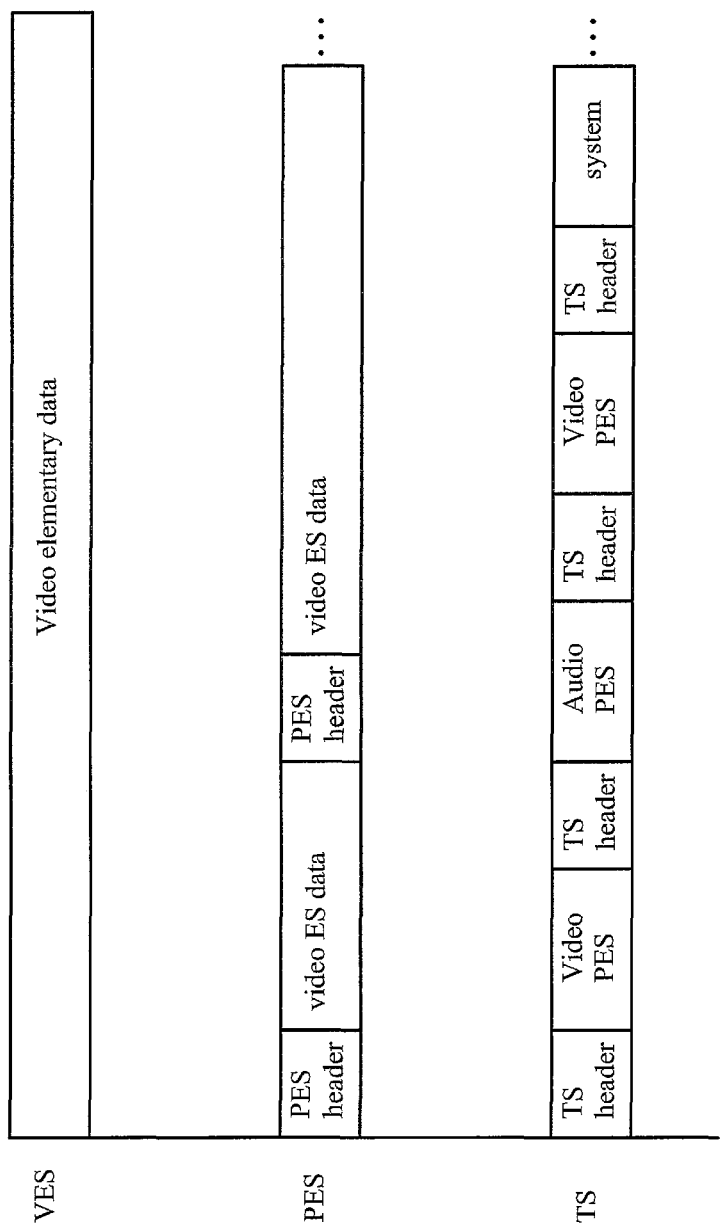
FIG. 7 shows data format of an elementary stream ES, a packetized elementary stream PES, and a transport stream TS.

FIG. 7 shows data format of an elementary stream ES, a packetized elementary stream PES, and a transport stream TS. Under MPEG transmission standards, the video elementary data ES including encoded image data are packetized into an appropriate size to thereby generate a packetized ES (PES). The packetized elementary stream PES is a specification defined by the MPEG communication protocol that allows the elementary stream ES to be divided into packets for data transmission. Typically, the video or audio elementary stream ES are passed to a video or audio encoder to be converted to video or audio PES packets, and then be encapsulated inside the transport stream TS or program stream. The video, audio and system TS packets can then be multiplexed and transmitted using broadcasting techniques, such as those used in an ATSC and DVB, which can be picked up by a receiver to perform demultiplex and decoding operations thereon to recover the video or audio elementary stream ES.

Figure 8:
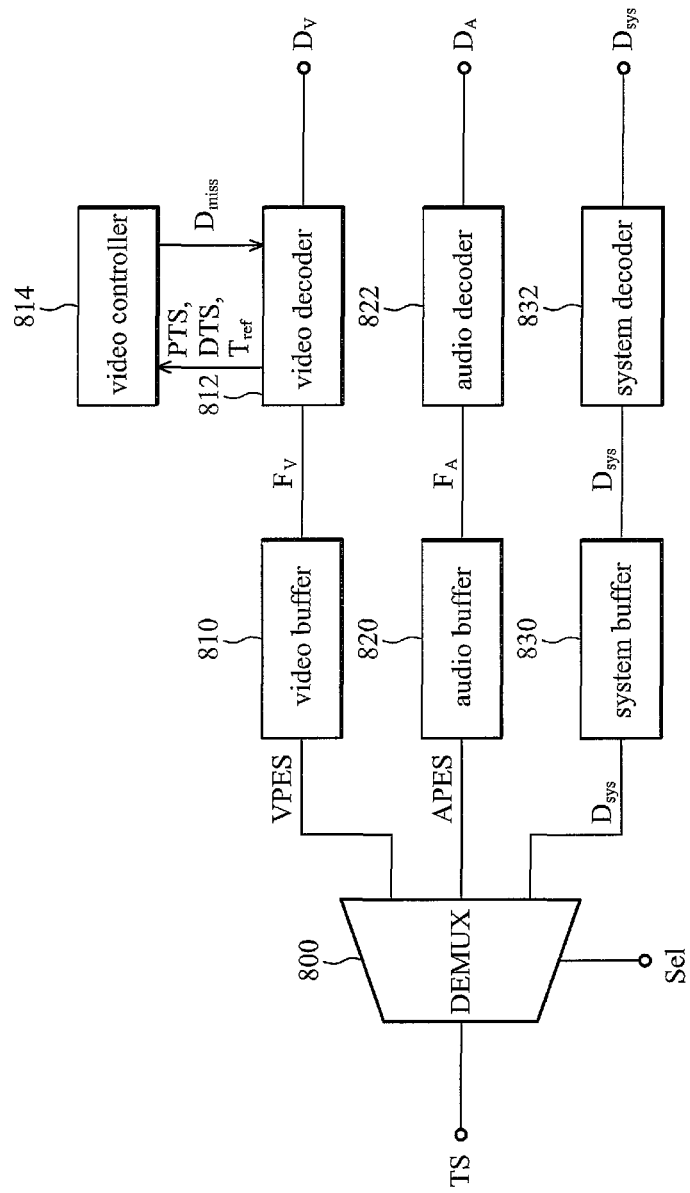
FIG. 8 is a block diagram of an exemplary MPEG decoder according to the invention.

FIG. 8 is a block diagram of an exemplary receiver implementing the decoding method according to the invention, comprising demultiplexer 800, video buffer 810, video decoder 812, video controller 814, audio buffer 820, audio decoder 822, system buffer 830, and system decoder 832. The demultiplexer 800 is coupled to the video buffer 810, audio buffer 820, and system buffer 830. The video buffer 810 is coupled to the video decoder 812, and subsequently coupled to the video controller 814. The audio buffer 820 is coupled to the audio decoder 822, and the system buffer 830 is coupled to the system decoder 832. The input transport stream TS is demultiplexed into video, audio, or system TS packets by the demultiplexer 800 according to a selection signal Sel, and the video, audio and system TS packets are passed to the video buffer 810, audio buffer 820, and system buffer 830 respectively. A TS header is removed from the video TS packet to provide a video PES VPES and then the video PES VPES is stored in the video buffer 810. Meanwhile, the TS headers are stripped off from audio and system TS to provide audio PES APES and system data $D_{sys}$ to be stored in the audio decoder 822 and system decoder 832.

The video decoder 812 obtains a video frame $F_V$ from the video buffer 810 by removing a PES header at the beginning of the video PES data. The PES header contains Presentation Time Stamp (PTS) and Decoding Time Stamp (DTS) information in an optional field thereof, which can be used to identify if there is a missing video frame. Similarly, audio frame $F_A$ and system data may be obtained by removing the PES headers at the audio decoder 822 and system decoder 832. After locating the picture start of the video frame, the video decoder 812 also acquires temporal reference information $T_{ref}$ successive thereto, and transfers the PTS, the DTS, and the temporal reference $T_{ref}$ to the video controller 814. The video controller 814 receives the PTS, the DTS, and the temporal reference $T_{ref}$ to determine whether there is a missing video frame, and informs the video decoder 812 of the determination of a missing frame by signal $D_{miss}$. Upon detection of a missing frame, the video decoder 812 performs video generation of a replacement video frame and performs video predictive decoding based on the replacement video frame.

The Decode Time Stamp (DTS) indicates the time at which a video frame $F_V$ should be instantaneously removed from the video buffer 810 and decoded by the video decoder 812. The Presentation Time Stamp (PTS) indicates the instant at which the decoded video frame $F_V$ should be removed from the receiver buffer, and presented for display. The PTS or DTS define the bitstream to be retrieved at intervals not exceeding 700 ms. The temporal reference $T_{ref}$ is reset to 0 after a GOP header, and is incremented by one for each video frame in display order. The video controller 814 may determine that there is no missing picture when the current temporal reference is consecutive to the previous temporal reference in display order, the current DTS of the current video frame does not exceed the previous DTS of the previous video frame by 700 ms, and the current PTS of the current video frame does not exceed the previous PTS of the previous video frame by 700 ms; otherwise the video controller 814 can indicate a missing video frame by signal $D_{miss}$.

Figure 9:
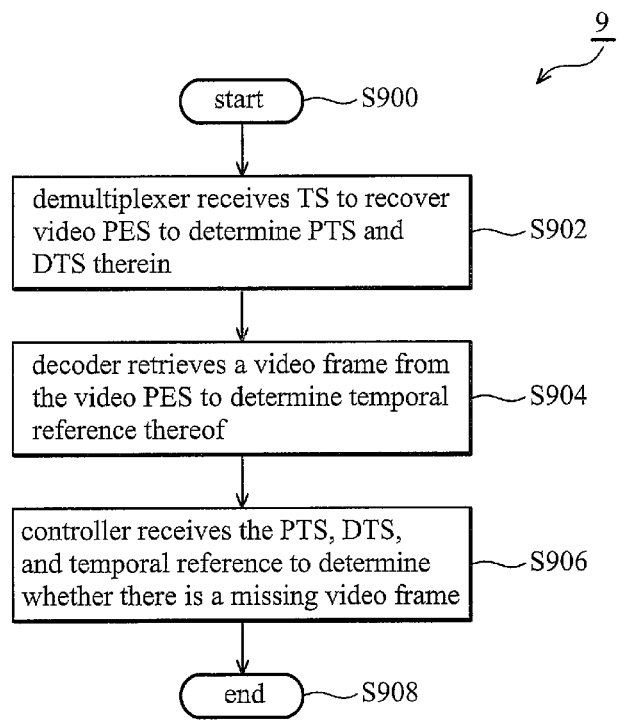
FIG. 9 is a flowchart of an exemplary detection method 9 for missing video frame according to the invention, incorporating the MPEG decoder in FIG. 8. The detection method 9 may be incorporated in step S514 in FIG. 5 to detect a missing video frame in a group of picture.

FIG. 9 is a flowchart of an exemplary detection method for missing video frame according to the invention, incorporating the receiver in FIG. 8. The detection method 9 may be incorporated in step S514 in FIG. 5 to detect a missing video frame in a group of picture.

Upon start of a detection method 9 for missing video frame (S900), the demultiplexer 800 receives the input Transport Stream TS to recover video Packetized Elementary Stream VPES and determines the presentation time stamp PTS and the decoding time stamp DTS in a PES header of the video PES (S902). The video decoder 812 retrieves the video frame $F_V$ from the video PES VPES and determines the temporal reference $T_{ref}$ of the video frame (S904), and the video controller 814 receives the PTS, the DTS, and the temporal reference to determine whether there is a missing video frame (S906). Upon detection of a missing video frame, the video decoder 812 generates a replacement video frame to substitute for the missing video frame as provided in step S516 in FIG. 5. The generation of the replacement video frame may be by assigning a closest decodable video frame in display order to be the replacement video frame, or generating a replacement video frame according to motion vectors of a decodable video frame and a temporal distance between the current video frame and the decodable video frame.

Figure 10:
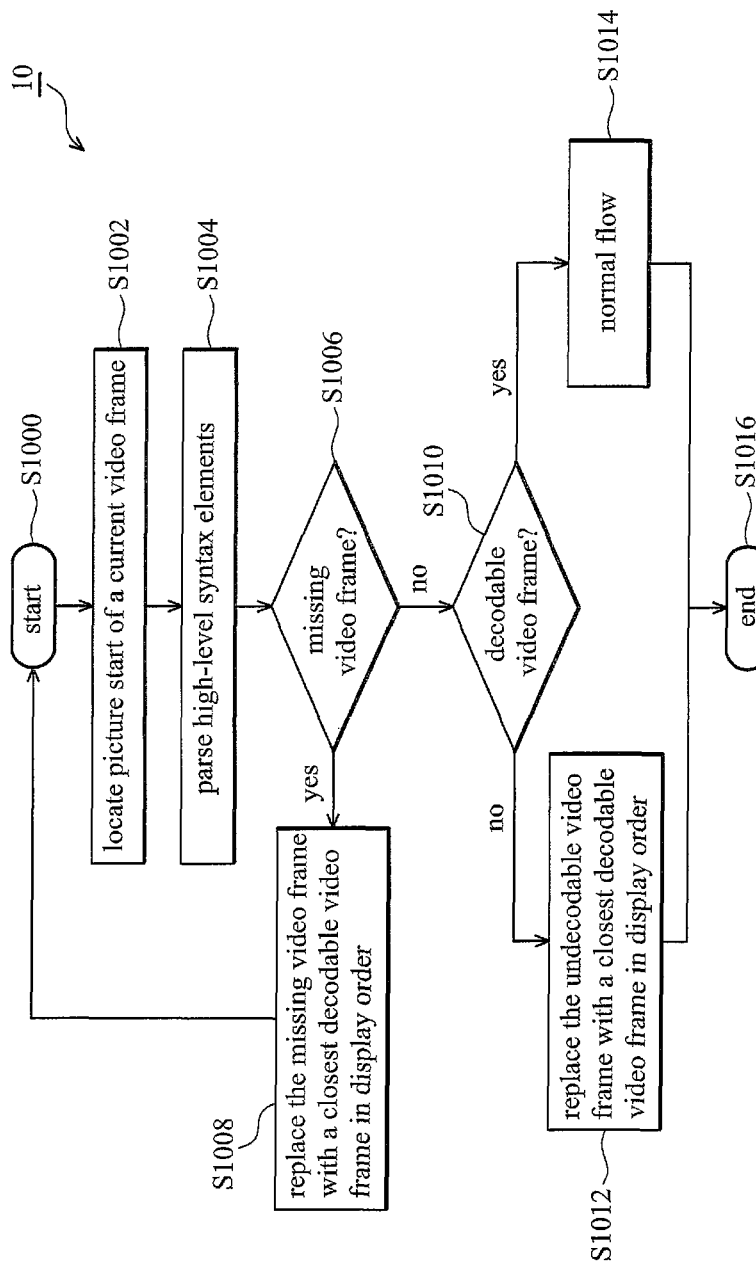
FIG. 10 is a flowchart of an exemplary video decoding method to substitute a missing video frame or an undecodable video frame according to the invention.

FIG. 10 is a flowchart of an exemplary video decoding method to substitute for a missing video frame or an undecodable video frame according to the invention.

Upon start of the video decoding method 10 (S1000), the video decoder retrieves a current video frame from a video buffer by locating the picture start of a video bitstream (S1002), and parses a current syntax element (S1004). In some embodiments, the video decoder checks and corrects the high-level syntax error before step S1004. The detailed description of the detection and correction of the high-level syntax error is provided in the embodiment in FIG. 5, and is not repeated here. In step S1006, the video decoder determines whether there is a missing video frame in the group of picture, and if so, replaces the missing video frame with a closest decodable video frame in display order (S1008), and otherwise continues to determine whether the current video frame is decodable (S1010), and replaces the undecodable video frame with a closest decodable video frame in display order upon the detection of an undecodable video frame (S1012). When there is no missing or undecodable video frame detected, the video decoder then carries out the video predictive decoding on the current video frame to recover video data $D_V$ and performs relevant data processing thereon (S1014), and exits the video decoding process 10 for the current video frame (S1016).

In step S1006, the missing picture may be identified according to the detection method disclosed in FIG. 9, i.e., determining whether there is a missing video frame using the PTS, the DTS, and the temporal reference information. In step S1010, the video frame is undecodable when the reference frame is missing, or when part or all of the picture data is corrupted.

Figure 11:
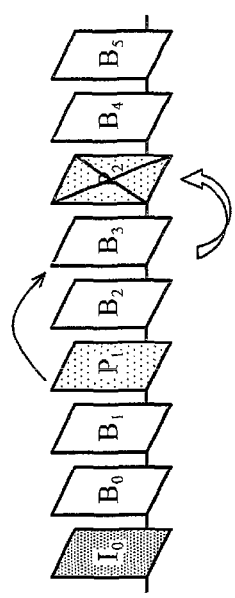
FIG. 11 illustrates an embodiment of substituting a replacement video frame for the missing or undecodable video frame according to the video decoding method in FIG. 10.

FIG. 11 illustrates an embodiment of substituting a replacement video frame for the missing or undecodable video frame according to the frame generation method in FIG. 10. In one embodiment, a reference video frame $P_2$ is missing or undecodable, and the video decoder therefore generates a replacement for the missing or undecodable P-frame $P_2$ according to a closest decodable video frame in display order, e.g., B-frame $B_3$, so that the video decoder can carries out the predictive decoding for dependent video frames of P-frame $P_2$, reducing the number of undecodable video frames and preventing a serious degradation of viewing quality. The replacement for P-frame $P_2$ can be either a reference frame (e.g. $P_1$) or non-reference frame that only have forward reference (e.g. $B_3$).

Figure 12:
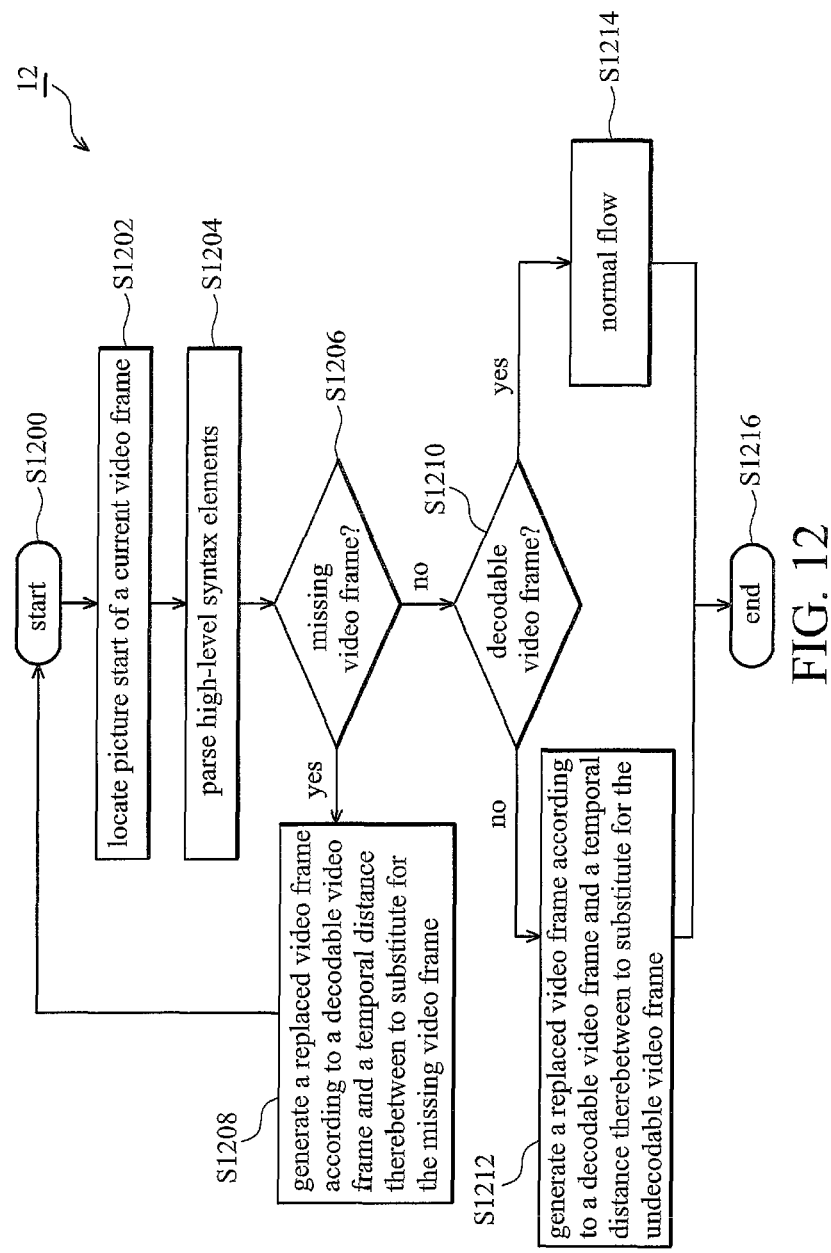
FIG. 12 is a flowchart of another exemplary video decoding method to substitute a missing video frame or an undecodable video frame according to the invention.

FIG. 12 is a flowchart of another exemplary video decoding method to substitute for a missing video frame or an undecodable video frame according to the invention.

Upon start of the video decoding method 12 (S1200), the video decoder retrieves a video bitstream from a video buffer to locate the start of a picture (S1202), and parses high-level syntax elements (S1204). In some embodiments, the video decoder checks and corrects the high-level syntax error before step S1204. The detailed description of the detection and correction of the high-level syntax error is provided in the embodiment in FIG. 5, and is not repeated here. In step S1206, the video decoder determines whether there is a missing video frame in the group of picture, if so, generates a replacement video frame according to motion vectors of a decodable video frame and a temporal distance between the current video frame and the decodable video frame, and replaces the missing video frame with the replacement video frame (S1208), and otherwise continues to determine whether the current video frame is decodable (S1210). In some embodiments, the current video frame is determined as undecodable if a reference frame of the current video frame is missing, or a picture-layer syntax error is detected. If the current video frame is undecodable, the video decoder generates a replacement video frame according to motion vectors of a decodable video frame and a temporal distance between the current video frame and the decodable video frame, and replaces the undecodable video frame with the replacement video frame (S1212). When no missing nor undecodable video frame is detected, the video decoder then carries out the video predictive decoding on the current video frame to recover video data $D_V$ and performs relevant data processing thereon (S1214), and exits the video decoding process for the current video frame in step S1216.

In step S1206, the missing picture may be identified according to the detection method disclosed in FIG. 9, i.e., determining whether there is a missing video frame using the PTS, the DTS, and the temporal reference information. In step S1212, the video frame is undecodable when the reference frame is missing, or when part or all of the picture data is corrupted.

Figure 13:
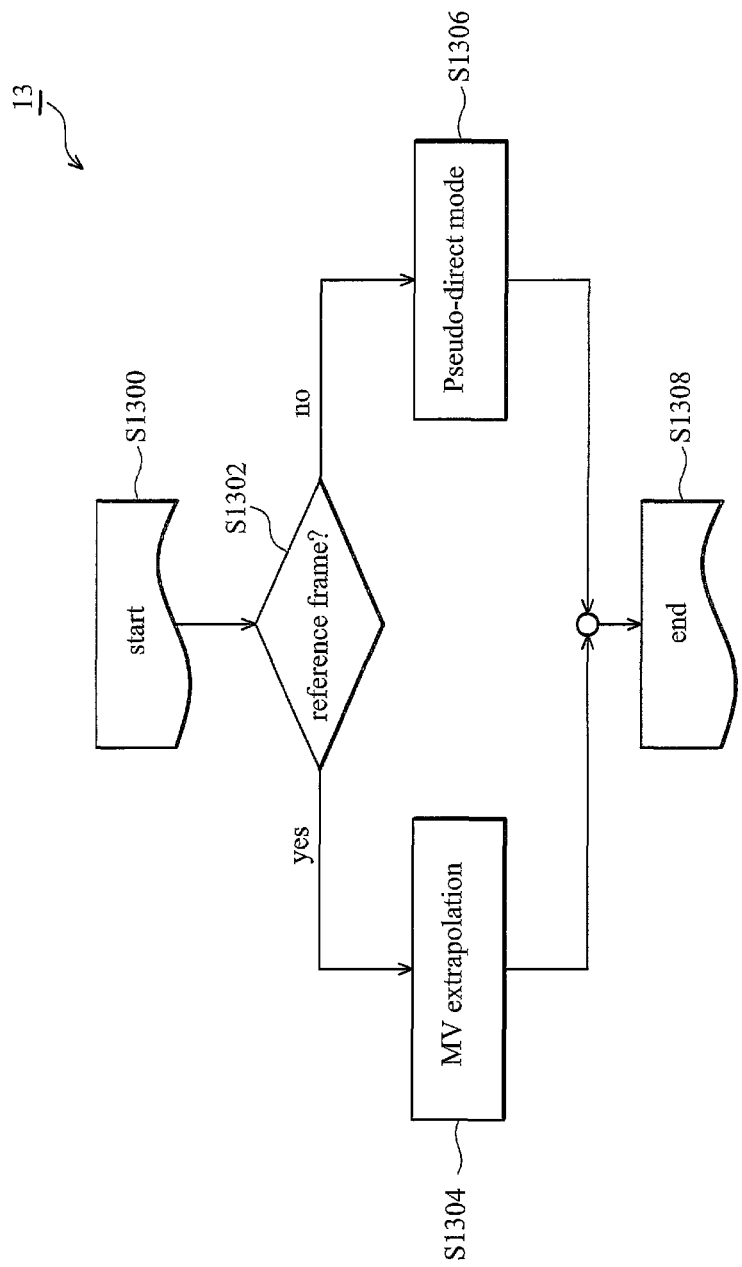
FIG. 13 is a flowchart of a detailed video frame generation method incorporated in steps S1208 or S1212 in FIG. 12.

In steps S1208 and S1212, the replacement video frames are generated according to the motion vectors of the decodable video frame, the temporal distance (time difference in display order) between the current video frame and the decodable video frame, and also the frame type of the missing or undecodable video frames. FIG. 13 is a flowchart of an exemplary method for generating the replacement video frame, incorporated in steps S1208 or S1212 in FIG. 12.

In step S1300, the video decoder detects the missing or undecodable video frame as in steps S1206 and S1210, and determines whether the missing or undecodable video frame is a reference video frame (e.g. I-frame and P-frame) in step S1302. If so, the video decoder then carries out motion vector (MV) extrapolation to generate the replacement video frame (S1304), and if not, the video decoder performs motion vector interpolation (pseudo direct mode) to generate the replacement video frame (S1306). After the replacement video frame is produced, the video decoder replaces the missing video frame or the undecodable video frame with the replacement video frame and the generation method 13 is exited (S1308).

Figure 14:
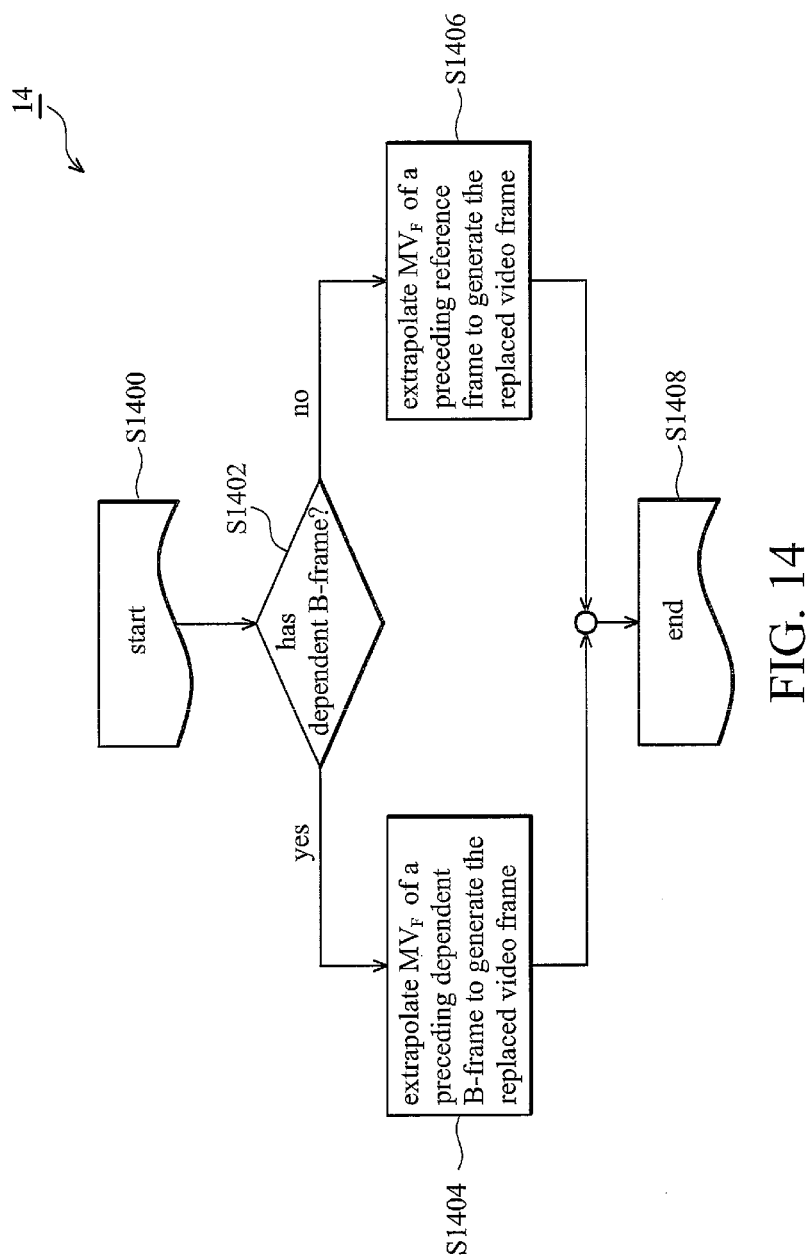
FIG. 14 is a flowchart of a detailed MV extrapolation method incorporated in steps S1304 in FIG. 13.

FIG. 14 is a flowchart of a detailed MV extrapolation method incorporated in steps S1304 in FIG. 13. Upon start of MV extrapolation method 14, the video decoder firstly determines whether the missing or undecodable video frame has a dependent non-reference frame (e.g. B-frame), and goes to step S1404 if so, and otherwise to step S1406.

In step S1404, when the missing video frame or the undecodable video frame is a reference frame with a dependent B-frame, the replacement video frame comprises only forward motion vectors. The replacement video frame is generated by extrapolating motion vectors of the preceding decodable dependent B-frame according to the temporal distances between the preceding decodable dependent B-frame and the current video frame, and between the other preceding decodable reference video frame and the current video frame, to generate the forward motion vectors of the replacement video frames. The preceding decodable dependent B-frame precedes the current video frame in display order.

In step S1406, when the missing video frame or the undecodable video frame is a reference frame without a dependent B-frame, the replacement video frame comprises only forward motion vectors. The replacement video frame is generated by extrapolating motion vectors of a preceding decodable reference frame according to the temporal distances between the preceding decodable reference frame, another preceding decodable frame, and the current video frame, to generate the forward motion vectors of the replacement video frames. The preceding decodable frames precede the current video frame in display order.

After the replacement video frame is reconstructed, MV extrapolation method 14 exits in step S1408.

Figure 15A:
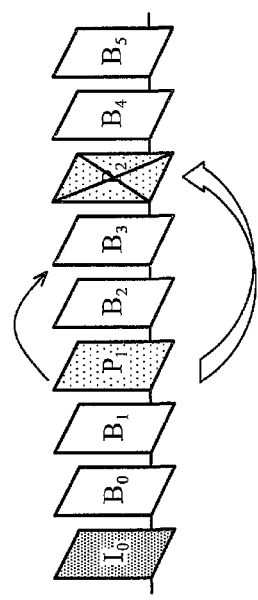
FIG. 15a illustrates an embodiment for generating a replacement video frame according to the MV extrapolation method in FIG. 14.
Figure 15B:
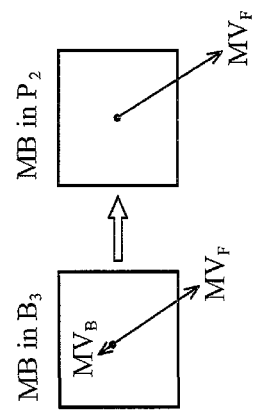

FIG. 15a illustrates an embodiment for generating a replacement video frame according to the MV extrapolation method in FIG. 14. In FIG. 15a, a reference frame $P_2$ is missing or undecodable (S1404), the video decoder generates the replacement video frame by extrapolating motion vectors of a preceding decodable dependent B-frame $B_3$ according to the temporal distances between the preceding decodable dependent B-frame $B_3$ and the current video frame, and between the other preceding decodable video frame $P_1$ and the current video frame, to generate the forward motion vectors of the replacement video frames. FIG. 15b illustrates an embodiment for generating a forward motion vector for a P-frame according to the embodiment in FIG. 15a. The video decoder uses only forward motion vector $MV_F$ of the B-frame $B_3$ and the temporal distances between frame $B_3$ and frame $P_2$, and between frame $P_1$ and frame $P_2$, to perform the MV extrapolation for generating forward motion vector $MV_F$ of the replacement video frame, as shown at the MB in frame $P_2$ at the right hand side illustration in FIG. 15b. If the resulting forward motion vector $MV_F$ of the replacement video frame exceeds the frame boundary, a MV clipping technique can be applied on the resulting forward motion vector $MV_F$.

Figure 16:
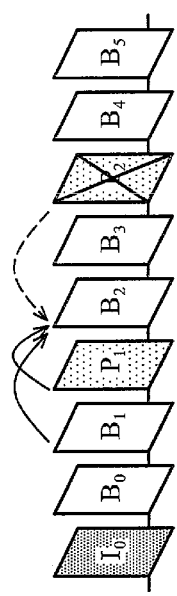
FIG. 16 illustrates another embodiment for generating a replacement video frame according to the MV extrapolation method in FIG. 14.

FIG. 16 illustrates another embodiment for generating a replacement video frame according to the MV extrapolation method in FIG. 14. In FIG. 16, a reference frame $P_2$ is missing or undecodable (S1404), and the video decoder generates the replacement video frame by extrapolating motion vectors of the preceding decodable B-frame $B_2$ according to the temporal distances between the preceding decodable B-frame $B_2$ and the current video frame $P_2$, and between the other preceding decodable P-frame $P_1$ and the preceding decodable B-frame $B_2$, to generate the forward motion vectors of the replacement video frames. In this embodiment, the B-frame $B_2$ backward refers to the missing or undecodable frame $P_2$, and a backward motion vector $MV_B$ of $B_2$ is properly scaled according to the temporal distance; for example, $MV_B$ of $B_2$ can be just negated and used to reference $B_1$, or it can be halved, negated and then used to reference $P_1$.

Figure 17:
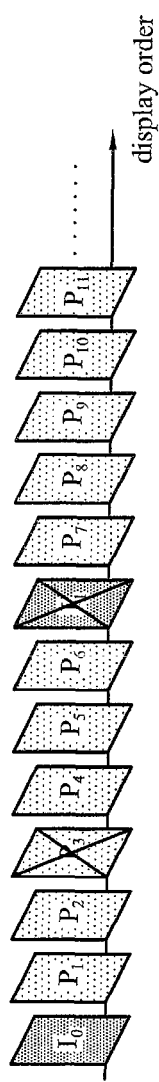
FIG. 17 illustrates yet another embodiment for generating a replacement video frame according to the MV extrapolation method in FIG. 14.

FIG. 17 illustrates yet another embodiment for generating a replacement video frame according to the MV extrapolation method in FIG. 14. In FIG. 17, a reference frame $P_3$ is missing or undecodable (S1406), thus the video decoder generates the replacement video frame by extrapolating motion vectors of a preceding decodable reference frame $P_2$ according to the temporal distance between the preceding decodable reference frame $P_2$ and another preceding decodable reference frame $P_1$, and the temporal distance between the preceding decodable reference frame $P_2$ and the current video frame, to generate the forward motion vectors of the replacement video frame.

Figure 18A:
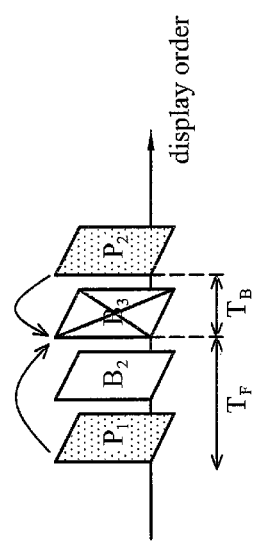
FIG. 18a illustrates an embodiment for generating a replacement video frame according to the pseudo-direct method in FIG. 13.

FIG. 18a illustrates an embodiment for generating a replacement video frame according to the pseudo-direct method S1306 in FIG. 13. When the missing video frame or the undecodable video frame is a bidirectional frame with decodable reference frames, the replacement video frame comprises forward and backward motion vectors. The replacement video frame is generated by proportionating (forward) motion vectors of the backward decodable reference frame of the missing or undecodable bidirectional frame according to the temporal distance $T_F$ between the preceding decodable reference frame and the undecodable video frame, and the temporal distance $T_B$ between the succeeding decodable reference frame and the undecodable video frame, to generate the forward and backward motion vectors of the replacement video frames. FIG. 18a illustrates that when a bidirectional frame $B_3$ is missing or undecodable, the video decoder computes the forward motion vector $MV_F(B_3)$ and backward $MV_B(B_3)$ according to the following equation:

$$\overrightarrow{MV_F(B_3)} = \left(\frac{T_F}{T_F + T_B}\right) \cdot \overrightarrow{MV_F(P_2)} \quad (1)$$

$$\overrightarrow{MV_B(B_3)} = \left(\frac{-T_B}{T_F + T_B}\right) \cdot \overrightarrow{MV_F(P_2)}$$

where the preceding decodable reference frame is frame $P_1$, the succeeding decodable reference frame is frame $P_2$, the temporal distance $T_F$ is a time difference between the preceding decodable reference frame $P_1$ and the undecodable video frame $B_3$, and the temporal distance $T_B$ is a time difference between the succeeding decodable reference frame $P_2$ and the undecodable video frame $B_3$.

Figure 18B:
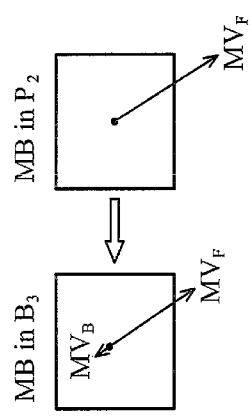
FIG. 18b illustrates an embodiment for generating a forward motion vector for a B-frame according to the method in FIG. 13.

FIG. 18b illustrates an embodiment for generating a forward motion vector for a B-frame according to the method in FIG. 13 and equation (1). The replacement video frame for video frame B3 comprises the forward motion vector $MV_F$ and the backward motion vector $MV_B$, computed according to the forward motion vector of a succeeding reference frame $P_2$ and an equation (1).

While the invention has been described by way of examples and in terms of preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A video decoding method, comprising:
recovering video Packetized Elementary Stream (PES) to determine a presentation time stamp (PTS) and a decoding time stamp (DTS) in a PES header of the PES;
retrieving a video frame from the video PES to determine temporal reference of the video frame;
determining that there is no missing video frame when the PTS of the current video frame does not exceed the PTS of the previous video frame by the predefined time interval; and
upon detection of the missing video frame, generating a replacement video frame to substitute for the missing video frame,
wherein the generation of the replacement video frame comprises generating the replacement video frame according to motion vectors of a decodable video frame and a temporal distance between the current video frame and the decodable video frame;
wherein when the missing video frame or undecodable video frame is a reference frame with a dependent B-frame, the replacement video frame comprises only forward motion vectors, the decodable video frame is a preceding non-reference frame in display order, and the generation comprises extrapolating motion vectors of the preceding non-reference frame and another preceding video frame according to the temporal distance to generate the forward motion vectors of the replacement video frame.

2. The video decoding method of claim 1, wherein the generation of the replacement video frame comprises assigning a closest decodable video frame in a display order to be the replacement video frame.

3. The video decoding method of claim 1, further comprising:
providing a historical syntax element of the previous video frame;
receiving the current video frame to determine a current syntax element therein;
determining whether a high-level syntax error is present in the current syntax element; and
upon detection of the high-level syntax error, determining a replaced syntax element according to the historical syntax element to replace the current syntax element,
wherein the high-level syntax error is a syntax error above a Macroblock layer.

4. The video decoding method of claim 3, wherein the high-level syntax error is a picture-layer syntax error.

5. The video decoding method of claim 3, wherein the previous video frame is in terms of the video decoding order.

6. The video decoding method of claim 3, wherein the determination of the replacement syntax element comprises using the historical syntax element to estimate the correct syntax element and assigning the estimated result to be the replacement syntax element.

7. The video decoding method of claim 1, wherein the predefined time interval is 700 ms.

8. A video decoding device capable of detecting a missing video frame, comprising:
a demultiplexer receiving a Transport Stream to recover video Packetized Elementary Stream (PES) to determine a presentation time stamp (PTS) and a decoding time stamp (DTS) in a PES header of the PES;
a first decoder retrieving a video frame from the video PES to determine temporal reference of the video frame; and
a controller receiving the PTS, the DTS, and the temporal reference and determining that there is no missing video frame when the temporal reference of a current video frame is consecutive to the temporal reference of a previous video frame in display order, the DTS of the current video frame does not exceed the DTS of the previous video frame by a predefined time interval, or the PTS of the current video frame does not exceed the PTS of the previous video frame by the predefined time interval,
a second decoder, generating a replacement video frame to substitute for the missing video frame upon detection of the missing video frame,
wherein the replacement video frame is generated according to motion vectors of a decodable video frame and a temporal distance between the current video frame and the decodable video frame,
wherein when the missing video frame or undecodable video frame is a reference frame with reference to a decodable reference frame, the replacement video frame comprises only forward motion vectors, the decodable video frame is a preceding decodable reference frame in display order, and the generation comprises extrapolating motion vectors of the preceding decodable reference frame according to the temporal distance to generate the forward motion vectors of the replacement video frames.

9. The video decoding device of claim 8, wherein the replacement video frame is generated according to a closest decodable video frame in a display order to be the replacement video frame.

10. The video decoding device of claim 8, wherein the predefined time interval is 700 ms.

11. A video decoding method, comprising:
recovering video Packetized Elementary Stream (PES) to determine a presentation time stamp (PTS) and a decoding time stamp (DTS) in a PES header of the PES;
retrieving a video frame from the video PES to determine temporal reference of the video frame;
determining that there is no missing video frame when the temporal reference of a current video frame is consecutive to the temporal reference of a previous video frame in display order or the DTS of the current video frame does not exceed the DTS of the previous video frame by a predefined time interval; and
upon detection of the missing video frame, generating a replacement video frame to substitute for the missing video frame,
wherein the generation of the replacement video frame comprises generating the replacement video frame according to motion vectors of a decodable video frame and a temporal distance between the current video frame and the decodable video frame,
wherein when the missing video frame or undecodable video frame is a non-reference frame with a decodable reference frame, the replacement video frame comprises forward and backward motion vectors, and the generation comprises proportionating motion vectors of backward decodable reference frame of the missing video frame or undecodable non-reference frame according to the temporal distances between the preceding decodable reference frame and the undecodable video frame and between the succeeding decodable reference frame and the undecodable video frame, to generate the forward and backward motion vectors of the replacement video frame.

12. The video decoding method of claim 11, wherein the generation of the replacement video frame comprises assigning a closest decodable video frame in a display order to be the replacement video frame.

* * * * *